US010067300B2

(12) United States Patent
Katagiyama et al.

(10) Patent No.: US 10,067,300 B2
(45) Date of Patent: Sep. 4, 2018

(54) CONNECTOR-EQUIPPED PLUG

(71) Applicant: JAPAN AVIATION ELECTRONICS INDUSTRY, LIMITED, Tokyo (JP)

(72) Inventors: Naoki Katagiyama, Tokyo (JP); Yuichi Koreeda, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 15/521,417

(22) PCT Filed: Sep. 25, 2015

(86) PCT No.: PCT/JP2015/077059
§ 371 (c)(1),
(2) Date: Apr. 24, 2017

(87) PCT Pub. No.: WO2016/103821
PCT Pub. Date: Jun. 30, 2016

(65) Prior Publication Data
US 2017/0307831 A1    Oct. 26, 2017

(30) Foreign Application Priority Data
Dec. 24, 2014  (JP) ................................. 2014-260504

(51) Int. Cl.
*G02B 6/38*    (2006.01)
(52) U.S. Cl.
CPC ......... *G02B 6/3881* (2013.01); *G02B 6/3821* (2013.01); *G02B 6/3825* (2013.01)
(58) Field of Classification Search
CPC ... G02B 6/3881; G02B 6/3821; G02B 6/3825
See application file for complete search history.

(56) References Cited

U.S. PATENT DOCUMENTS 4,296,999 A  * 10/1981  Mead ...................... G02B 6/32
                                                        385/61
5,166,995 A  * 11/1992  Briggs ................ G02B 6/3807
                                                        385/58
(Continued)

FOREIGN PATENT DOCUMENTS

JP        08-106028 A     4/1996
JP        08-220381 A     8/1996
(Continued)

OTHER PUBLICATIONS

U.S. Appl. No. 15/500,254 to Yuichi Koreeda et al., filed Jan. 30, 2017.
(Continued)

*Primary Examiner* — Peter Radkowski
(74) *Attorney, Agent, or Firm* — Greenblum & Bernstein, P.L.C.

(57) ABSTRACT

A connector-equipped plug which has a built-in connector to be inserted into and connected to an adaptor inside a receptacle and is to be connected to the receptacle includes an inner housing that is located on a rear end side in an insertion direction of the connector to hold the connector and has a plurality of protrusions formed on an outer peripheral surface, a spring that pushes the inner housing in the insertion direction, and a tubular outer shell member that has a plurality of recesses formed in an inner peripheral surface. The connector has a tapered shape on a distal end side in the insertion direction, and the recesses are each formed such that the recess decreases gradually in width in the insertion direction and such that a bottom surface gradually approaches a central axis of the outer shell member.

20 Claims, 13 Drawing Sheets

(56) References Cited

U.S. PATENT DOCUMENTS

| | | | | |
|---|---|---|---|---|
| 5,528,711 A * | 6/1996 | Iwano | G02B 6/3817 | 385/55 |
| 5,588,079 A * | 12/1996 | Tanabe | G02B 6/3831 | 385/78 |
| 6,085,003 A * | 7/2000 | Knight | G02B 6/3869 | 385/59 |
| 6,918,704 B2 * | 7/2005 | Marrs | G02B 6/3843 | 385/53 |
| 7,044,650 B1 * | 5/2006 | Tran | G02B 6/3874 | 385/54 |
| 7,150,567 B1 * | 12/2006 | Luther | G02B 6/3851 | 385/60 |
| 7,207,727 B2 * | 4/2007 | Tran | G02B 6/3825 | 385/54 |
| 7,232,259 B2 * | 6/2007 | Greub | G02B 6/3812 | 385/60 |
| 7,387,446 B2 * | 6/2008 | Greub | G02B 6/3812 | 385/60 |
| 7,720,345 B2 * | 5/2010 | Katagiyama | G02B 6/3898 | 385/134 |
| 7,744,286 B2 * | 6/2010 | Lu | G02B 6/3816 | 385/53 |
| 7,744,288 B2 * | 6/2010 | Lu | G02B 6/3816 | 385/60 |
| 7,762,726 B2 * | 7/2010 | Lu | G02B 6/3816 | 385/53 |
| 7,785,019 B2 * | 8/2010 | Lewallen | G02B 6/3817 | 385/53 |
| 7,942,590 B2 * | 5/2011 | Lu | G02B 6/3816 | 385/78 |
| 7,959,361 B2 * | 6/2011 | Lu | G02B 6/3816 | 385/53 |
| 8,202,008 B2 * | 6/2012 | Lu | G02B 6/3816 | 385/53 |
| 8,226,302 B2 * | 7/2012 | Kobayashi | G02B 6/3897 | 385/58 |
| 8,337,093 B2 * | 12/2012 | Parkman, III | G02B 6/3871 | 385/53 |
| 8,376,628 B2 * | 2/2013 | Koreeda | G02B 6/3879 | 385/60 |
| 8,506,173 B2 * | 8/2013 | Lewallen | G02B 6/3817 | 385/53 |
| 8,721,190 B2 | 5/2014 | Koreeda et al. | | |
| 8,757,915 B2 * | 6/2014 | Sugimoto | G02B 6/3897 | 385/60 |
| 8,992,097 B2 | 3/2015 | Koreeda et al. | | |
| 9,063,300 B2 | 6/2015 | Torikai et al. | | |
| 2002/0081077 A1 | 6/2002 | Nault | | |
| 2002/0186931 A1 | 12/2002 | Seo et al. | | |
| 2003/0142919 A1 * | 7/2003 | Zimmel | G02B 6/3843 | 385/78 |
| 2006/0018603 A1 * | 1/2006 | Greub | G02B 6/3812 | 385/60 |
| 2006/0088247 A1 * | 4/2006 | Tran | G02B 6/3874 | 385/55 |
| 2006/0088248 A1 * | 4/2006 | Tran | G02B 6/3825 | 385/55 |
| 2006/0204178 A1 * | 9/2006 | Theuerkorn | G02B 6/3821 | 385/59 |
| 2006/0269194 A1 * | 11/2006 | Luther | G02B 6/3851 | 385/78 |
| 2007/0160327 A1 * | 7/2007 | Lewallen | G02B 6/3817 | 385/53 |
| 2007/0217747 A1 * | 9/2007 | Greub | G02B 6/3812 | 385/60 |
| 2009/0116794 A1 * | 5/2009 | Katagiyama | G02B 6/3807 | 385/81 |
| 2009/0148101 A1 * | 6/2009 | Lu | G02B 6/3816 | 385/56 |
| 2009/0148102 A1 * | 6/2009 | Lu | G02B 6/3816 | 385/60 |
| 2009/0148103 A1 * | 6/2009 | Lu | G02B 6/3816 | 385/62 |
| 2009/0148104 A1 * | 6/2009 | Lu | G02B 6/3816 | 385/72 |
| 2010/0104355 A1 * | 4/2010 | Sugimoto | G02B 6/3897 | 403/292 |
| 2010/0226610 A1 * | 9/2010 | Kobayashi | G02B 6/3885 | 385/58 |
| 2010/0266242 A1 * | 10/2010 | Lu | G02B 6/3816 | 385/53 |
| 2010/0266244 A1 * | 10/2010 | Lu | G02B 6/3816 | 385/60 |
| 2010/0290741 A1 * | 11/2010 | Lu | G02B 6/3816 | 385/60 |
| 2010/0296778 A1 * | 11/2010 | Katagiyama | G02B 6/3838 | 385/60 |
| 2010/0310213 A1 * | 12/2010 | Lewallen | G02B 6/3817 | 385/75 |
| 2011/0075972 A1 * | 3/2011 | Parkman, III | G02B 6/3869 | 385/78 |
| 2011/0211792 A1 * | 9/2011 | Koreeda | G02B 6/3879 | 385/60 |
| 2012/0071019 A1 | 3/2012 | Takamatsu | | |
| 2012/0282819 A1 | 11/2012 | Durand | | |
| 2013/0026482 A1 | 1/2013 | Fenwick | | |
| 2015/0247977 A1 | 9/2015 | Shimakawa | | |

FOREIGN PATENT DOCUMENTS

| | | | |
|---|---|---|---|
| JP | 08220381 A | * | 8/1996 |
| JP | 11-305073 A | | 11/1999 |
| JP | 2002-318324 A | | 10/2002 |
| JP | 2013-44952 A | | 3/2013 |
| JP | 2015-161920 A | | 9/2015 |
| JP | 5801462 B | | 10/2015 |
| TW | 201324985 A | | 6/2013 |
| TW | 201400901 A | | 1/2014 |

OTHER PUBLICATIONS

Office Action issued in EP family member Patent Appl. No. 15872390.8, dated Oct. 12, 2017.

* cited by examiner

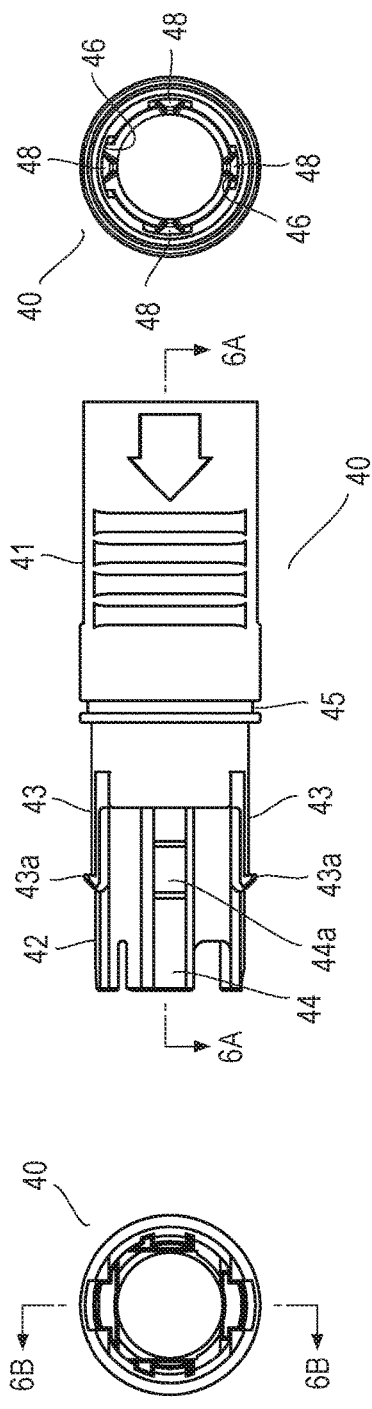
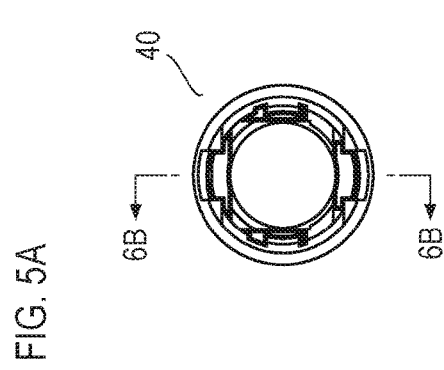
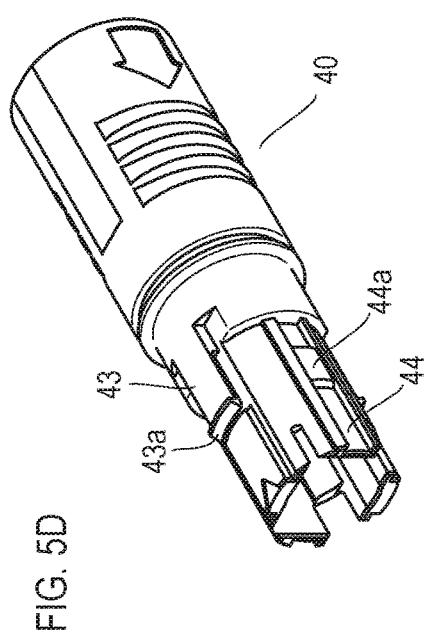

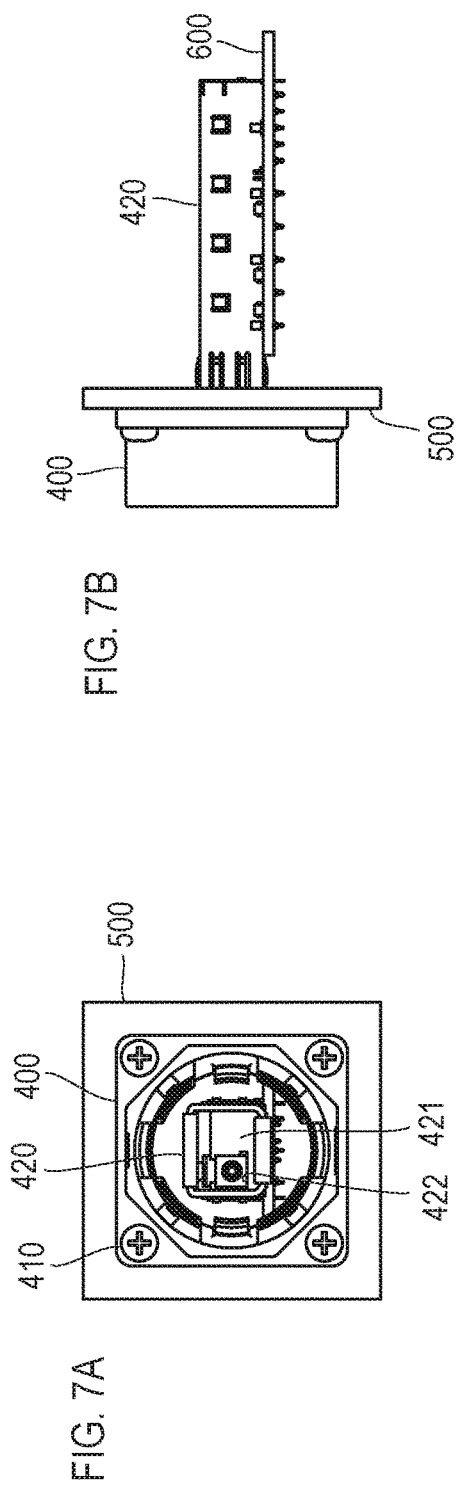
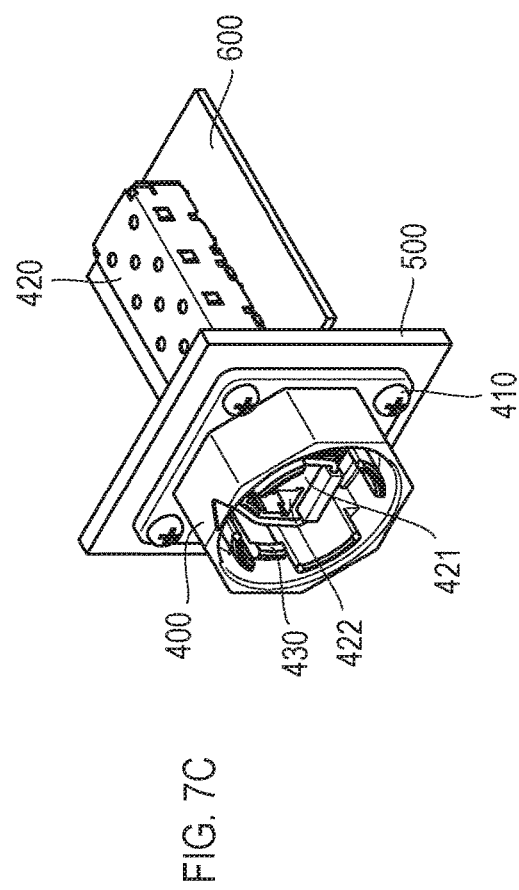

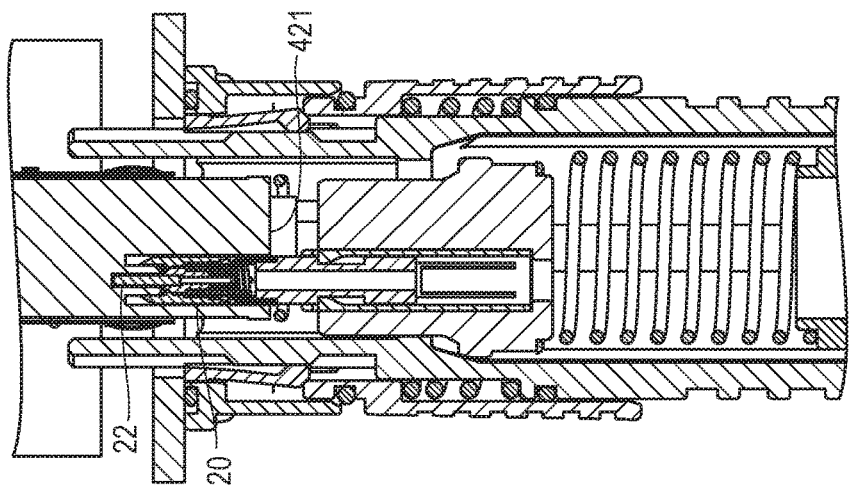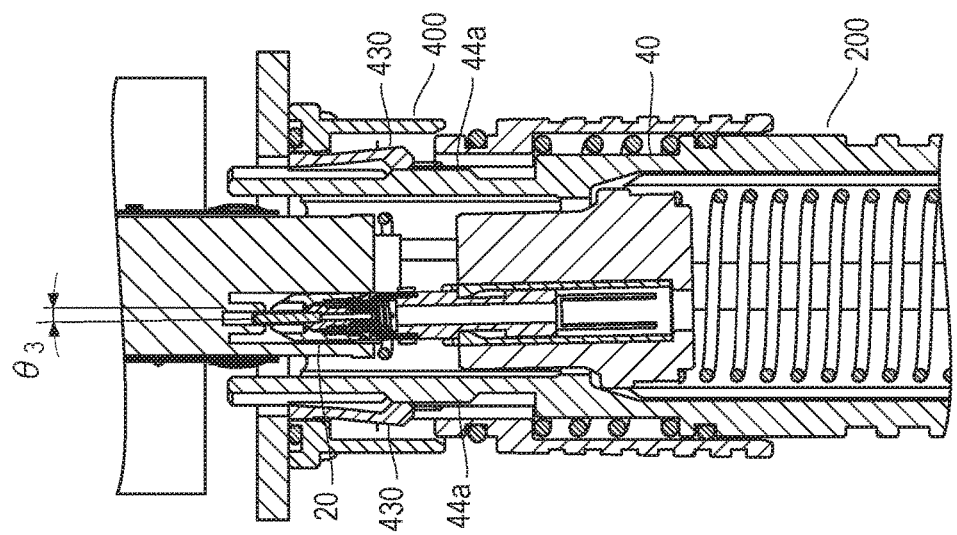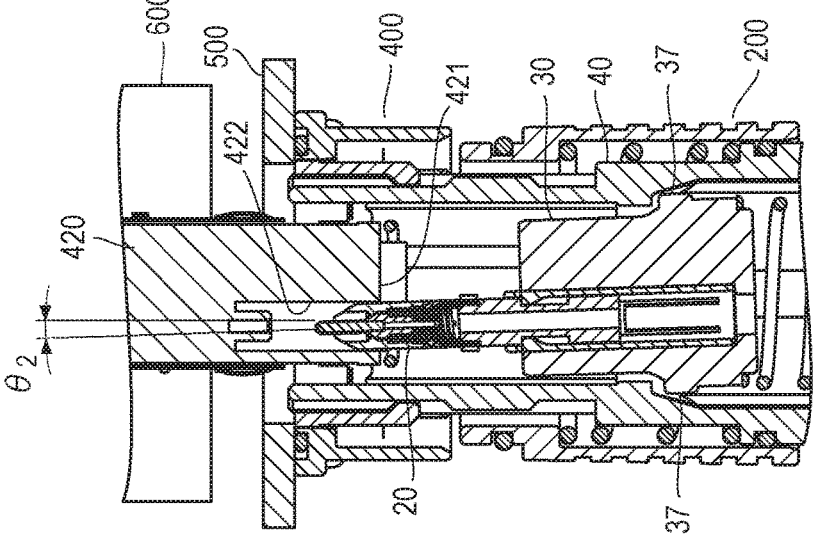

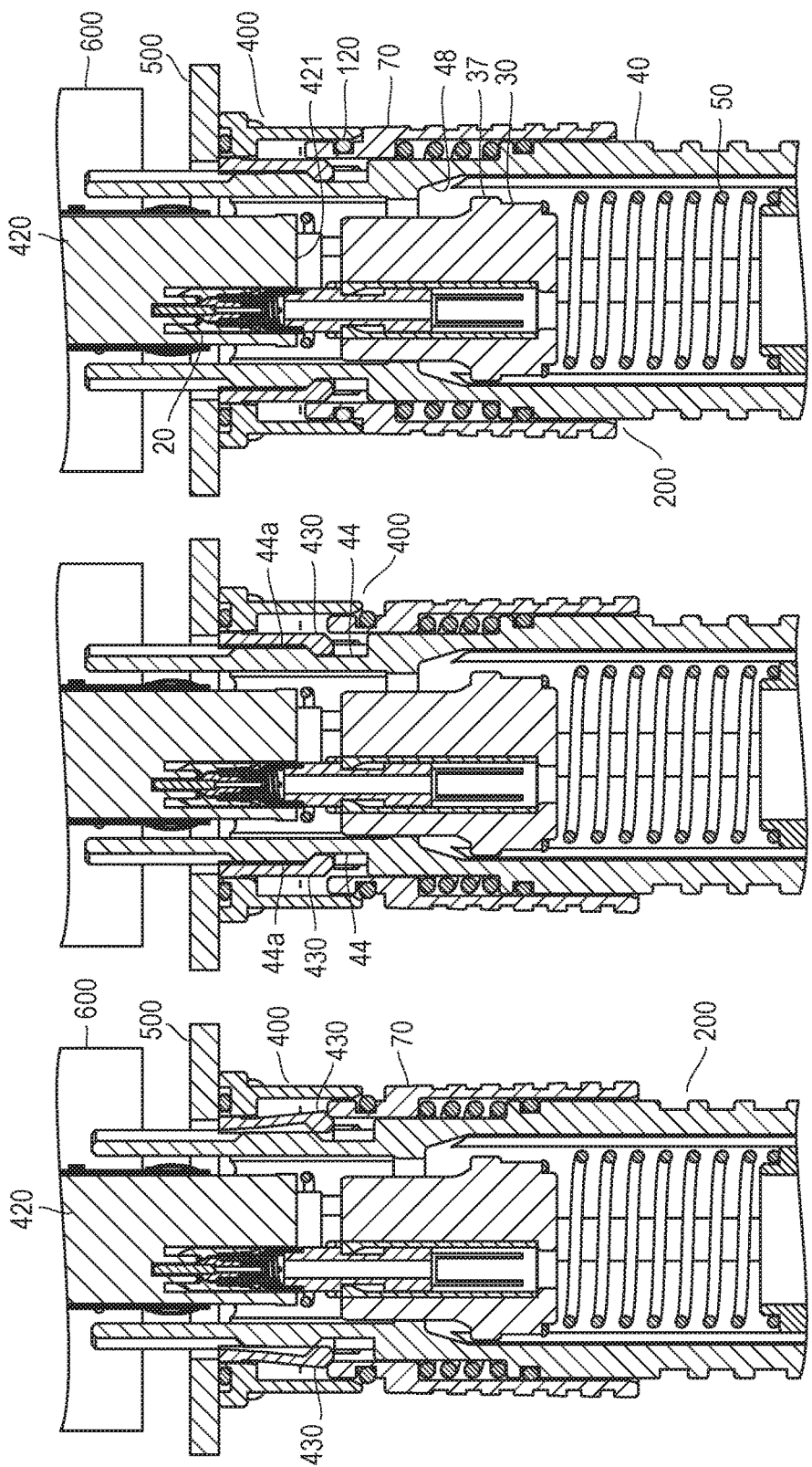

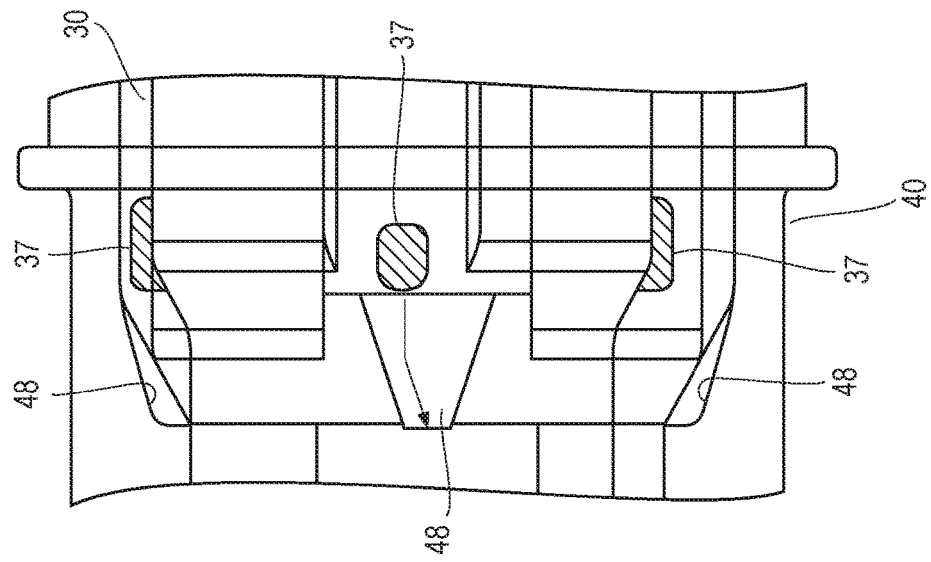
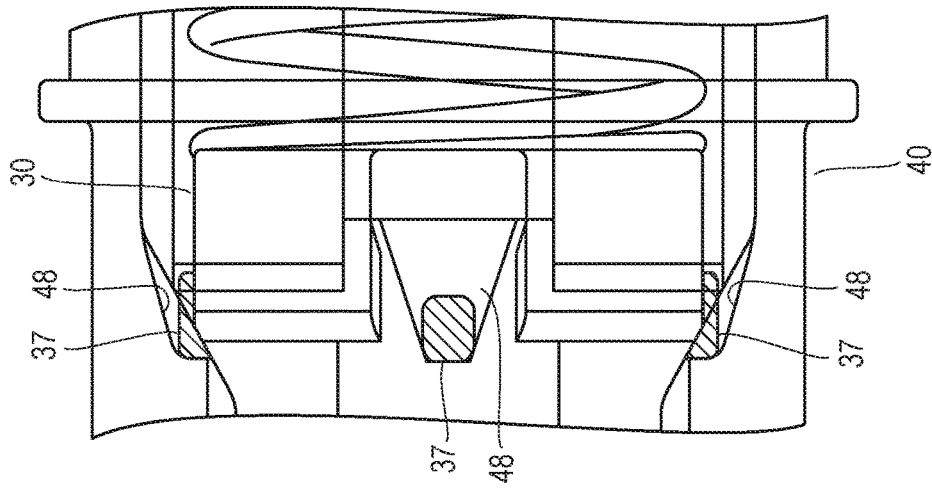

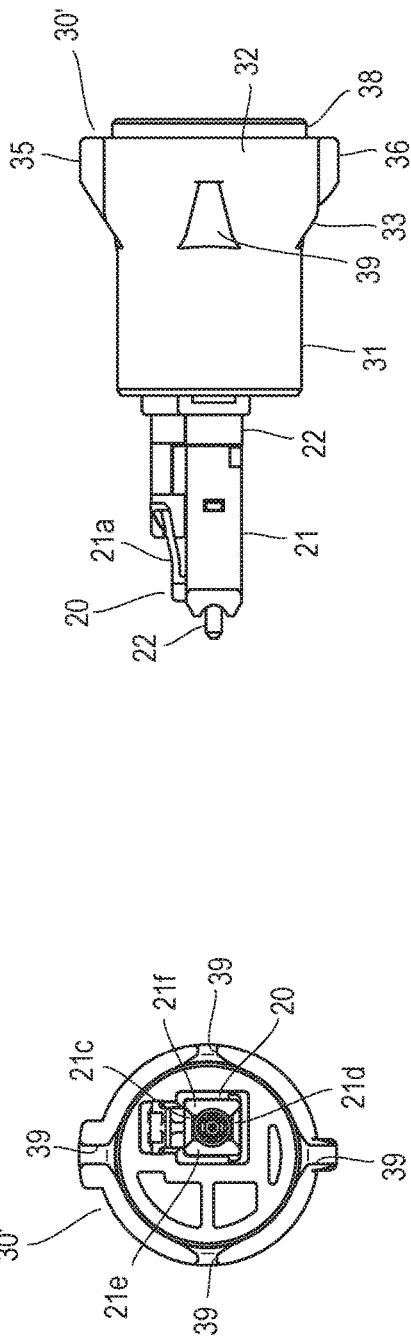
FIG. 12A
FIG. 12B
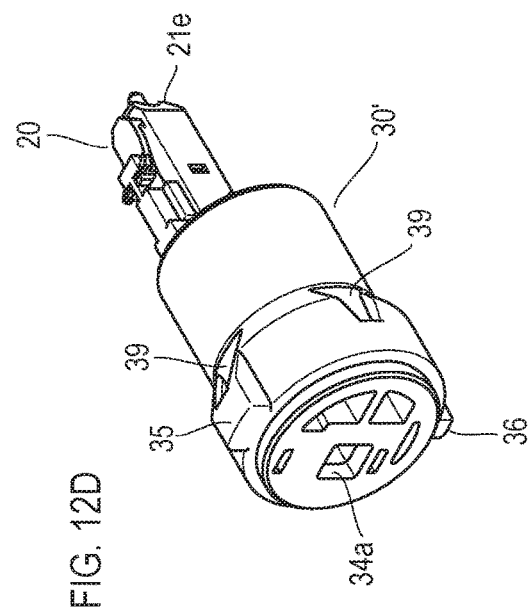
FIG. 12D
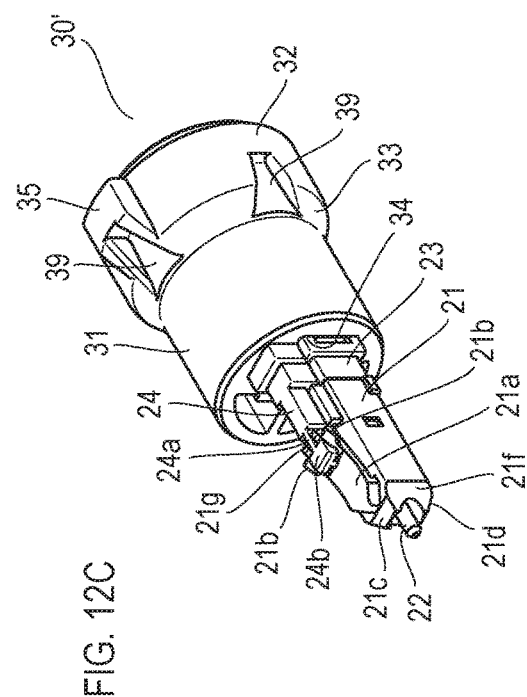
FIG. 12C

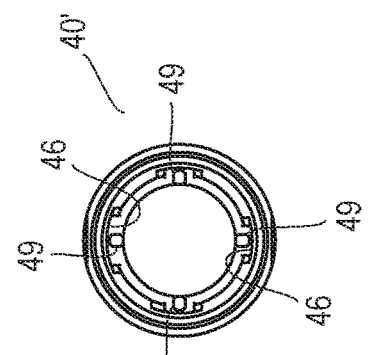
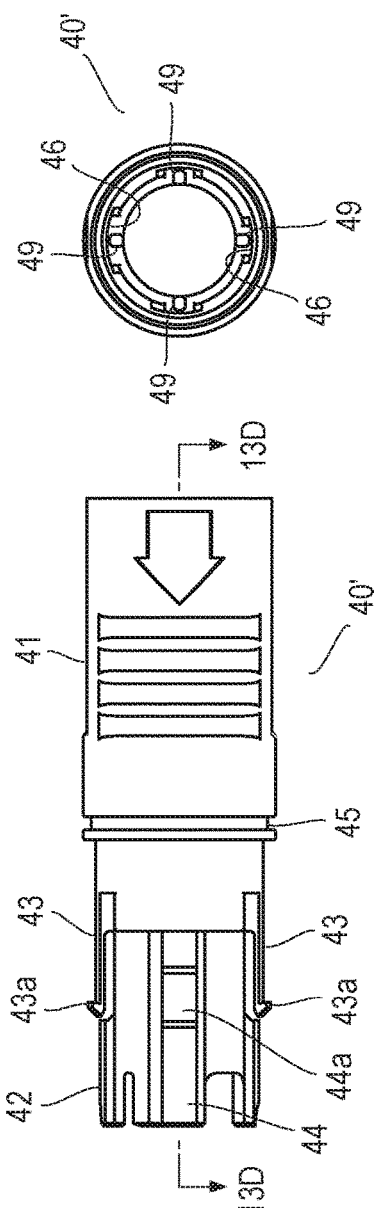
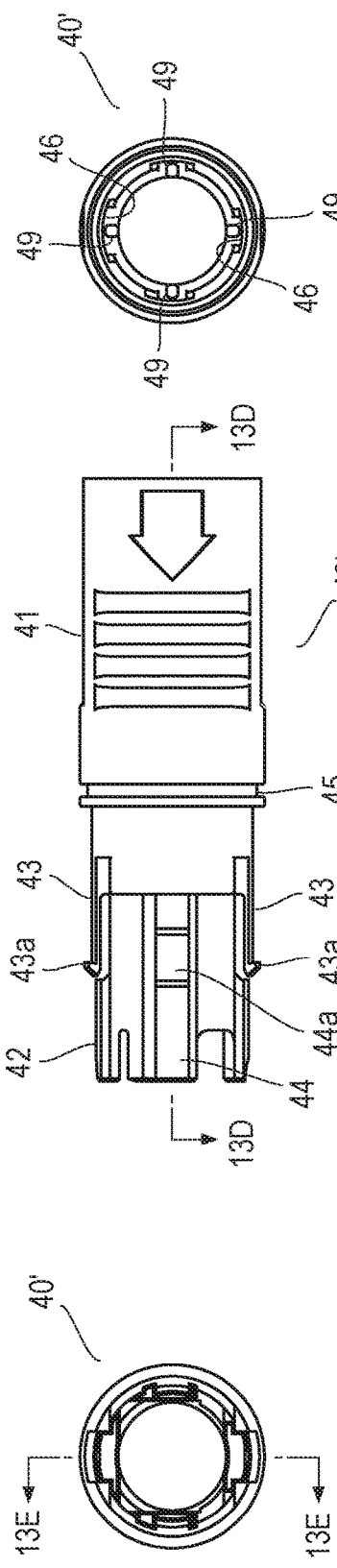
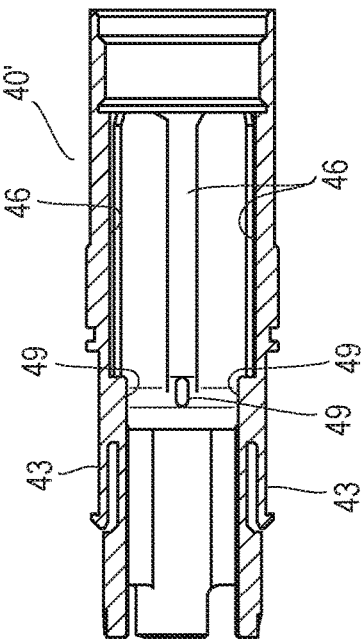
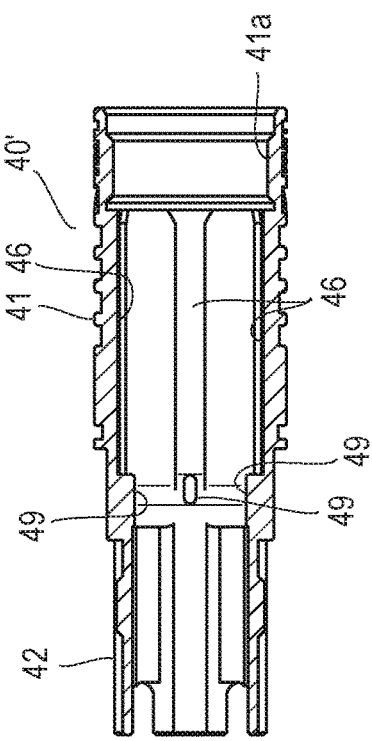

CONNECTOR-EQUIPPED PLUG

TECHNICAL FIELD

The present invention relates to a connector-equipped plug which has a built-in connector.

BACKGROUND ART

FIG. 1 shows the configuration described in Patent Literature 1 as a conventional example of such a connector-equipped plug. In FIG. 1, reference numeral 11 denotes a main body portion and 12 denotes an optical connector which is built into the main body portion 11. The optical connector 12 has a latch portion 12a for being latched to a mating optical module to be connected thereto. Reference numeral 13 denotes a coupling member to be coupled to a mating adaptor storing the optical module.

PRIOR ART LITERATURE

Patent Literature

Patent Literature 1: Japanese Patent Application Laid Open No. 2013-44952

SUMMARY OF THE INVENTION

Problems to be Solved by the Invention

In the conventional connector-equipped plug having the configuration as shown in FIG. 1, the optical connector 12 is fixedly arranged inside the main body portion 11. Thus, if the positional accuracy between a mating optical module, to which the optical connector 12 of the connector-equipped plug is to be connected, and a mating receptacle (referred to as an adaptor in Patent Literature 1), which the coupling member 13 is to be coupled to and which the main body portion 11 is to be fit in, is low, the problem of the inability of the connector-equipped plug to be connected may occur.

An object of the present invention is to provide a connector-equipped plug which is configured so that a connector is successfully guided in and connected to an adaptor inside a mating receptacle, which the connector is to be inserted into and connected to, even if positional accuracy of the adaptor is low, and is thus configured so as to allow successful connection to the mating receptacle.

Means to Solve the Problems

According to a first aspect of the present invention, a connector-equipped plug which has a built-in connector to be inserted into and connected to an adaptor inside a receptacle and is to be connected to the receptacle includes an inner housing that is located on a rear end side in an insertion direction of the connector to hold the connector and has a plurality of protrusions formed on an outer peripheral surface, a spring that pushes the inner housing in the insertion direction, and a tubular outer shell member that has a plurality of recesses formed in an inner peripheral surface. The connector has a tapered shape on a distal end side in the insertion direction. The recesses are each formed such that the recess decreases gradually in width in the insertion direction and such that a bottom surface gradually approaches a central axis of the outer shell member. The inner housing is positioned by being pushed by the spring to fit the protrusions in distal end sides in the insertion direction of the respective recesses and is tiltable while the protrusions fit in the recesses.

According to a second aspect of the present invention, a connector-equipped plug which has a built-in connector to be inserted into and connected to an adaptor inside a receptacle and is to be connected to the receptacle includes an inner housing that is located on a rear end side in an insertion direction of the connector to hold the connector and has a plurality of recesses formed in an outer peripheral surface, a spring that pushes the inner housing in the insertion direction, and a tubular outer shell member that has a plurality of protrusions formed on an inner peripheral surface. The connector has a tapered shape on a distal end side in the insertion direction. The recesses are each formed such that the recess decreases gradually in width and depth in a direction opposite to the insertion direction. The inner housing is positioned by being pushed by the spring to fit the protrusions in rear end sides in the insertion direction of the respective recesses and is tiltable while the protrusions fit in the recesses.

Effects of the Invention

According to the present invention, an inner housing that holds a connector is tiltable while being positioned at an initial position, and a distal end of the connector has a tapered shape. Even if positional accuracy of an adaptor inside a mating receptacle is low, and the distal end of the connector butts against an edge of an opening of the adaptor at the time of insertion of a connector-equipped plug into the receptacle, the connector inclines promptly to be guided into the opening. The inner housing is structured to move backward and float at the time of the insertion into the receptacle.

Thus, even if positional accuracy of an adaptor inside a receptacle is low, a connector-equipped plug according to the present invention can be connected to the receptacle without trouble.

BRIEF DESCRIPTION OF THE DRAWINGS

FIG. 5A is a front view of an outer shell member in FIG. 2B.

FIG. 5B is a side view of the outer shell member shown in FIG. 5A.

FIG. 5C is a back view of the outer shell member shown in FIG. 5A.

FIG. 5D is a perspective view of the outer shell member shown in FIG. 5A.

FIG. 7A is a front view of a receptacle to which the connector-equipped plug is to be connected.

FIG. 7B is a side view of the receptacle shown in FIG. 7A.

FIG. 7C is a perspective view of the receptacle shown in FIG. 7A.

FIG. 9A is a view for explaining a process (3) of the connection between the connector-equipped plug and the receptacle.

FIG. 9B is a view for explaining a process (4) of the connection between the connector-equipped plug and the receptacle.

FIG. 9C is a view for explaining a process (5) of the connection between the connector-equipped plug and the receptacle.

FIG. 10A is a view for explaining a process (6) of the connection between the connector-equipped plug and the receptacle.

FIG. 10B is a view for explaining a process (7) of the connection between the connector-equipped plug and the receptacle.

FIG. 10C is a view for explaining a process (8) of the connection between the connector-equipped plug and the receptacle.

FIG. 11A is a view for explaining a relationship between protrusions of the inner housing and recesses of the outer shell member.

FIG. 11B is a view for explaining a relationship between the protrusions of the inner housing and the recesses of the outer shell member.

FIG. 12A is a front view of an inner housing in another embodiment of the connector-equipped plug according to the present invention.

FIG. 12B is a side view of the inner housing shown in FIG. 12A.

FIG. 12C is a perspective view of the inner housing shown in FIG. 12A.

FIG. 12D is a perspective view of the inner housing shown in FIG. 12A.

FIG. 13A is a front view of an outer shell member in the embodiment of the connector-equipped plug according to the present invention.

FIG. 13B is a side view of the outer shell member shown in FIG. 13A.

FIG. 13C is a back view of the outer shell member shown in FIG. 13A.

FIG. 13D is a sectional view taken along line 13D-13D of FIG. 13B.

FIG. 13E is a sectional view taken along line 13E-13E of FIG. 13A.

DETAILED DESCRIPTION OF THE EMBODIMENTS

Embodiments of the present invention will be described below.

Figure 1:
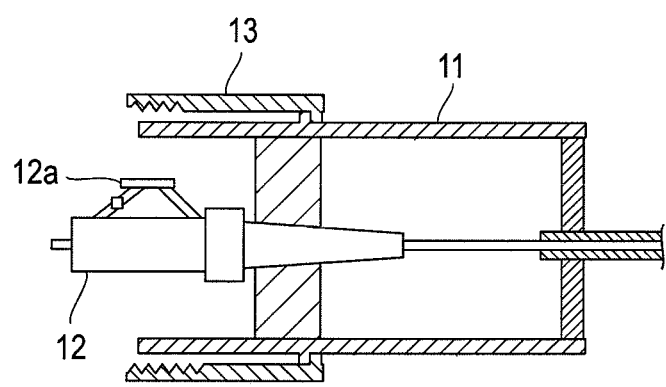
FIG. 1 is a sectional view showing a conventional example of a connector-equipped plug.
Figure 2:
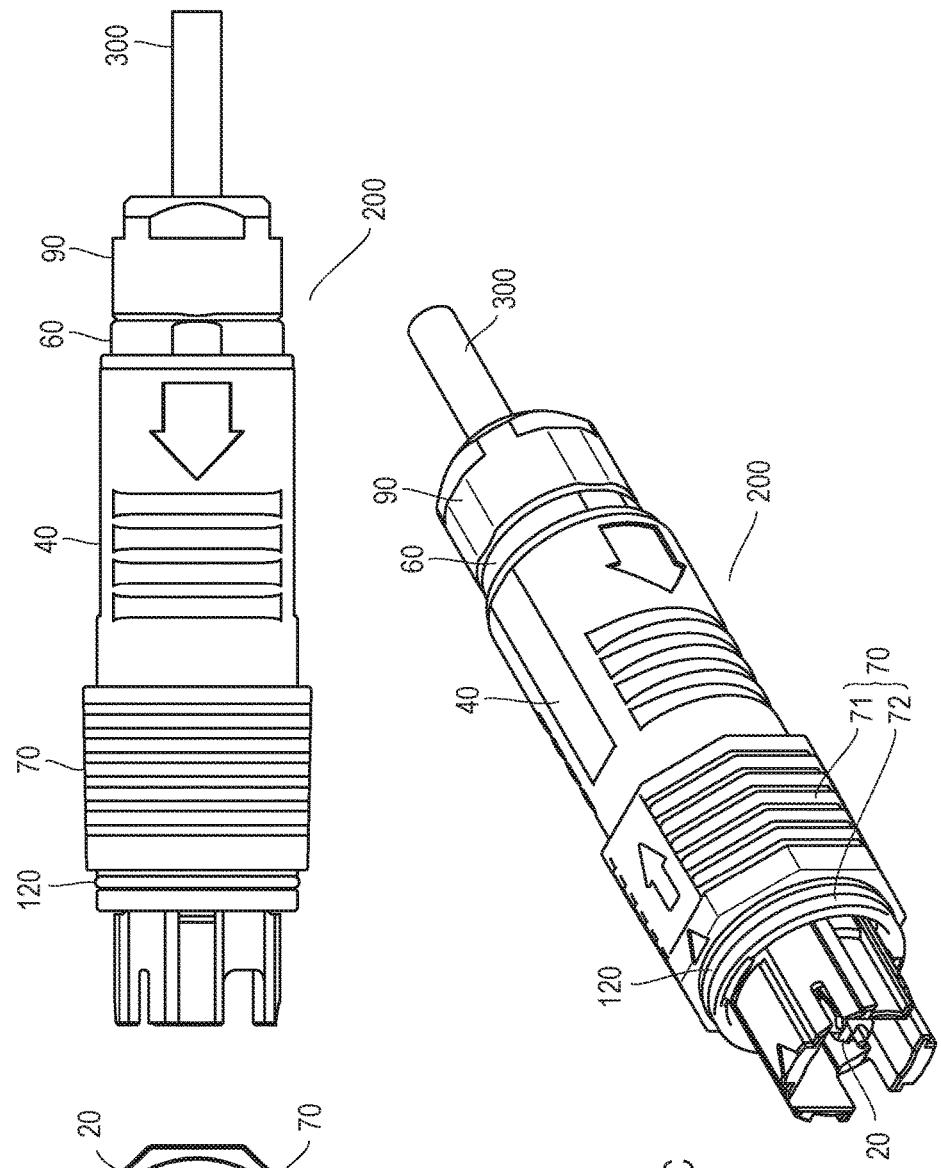
FIG. 2A is a front view showing an embodiment of a connector-equipped plug according to the present invention.
FIG. 2B is a side view of the connector-equipped plug shown in FIG. 2A.
FIG. 2C is a perspective view of the connector-equipped plug shown in FIG. 2A.
Figure 3:
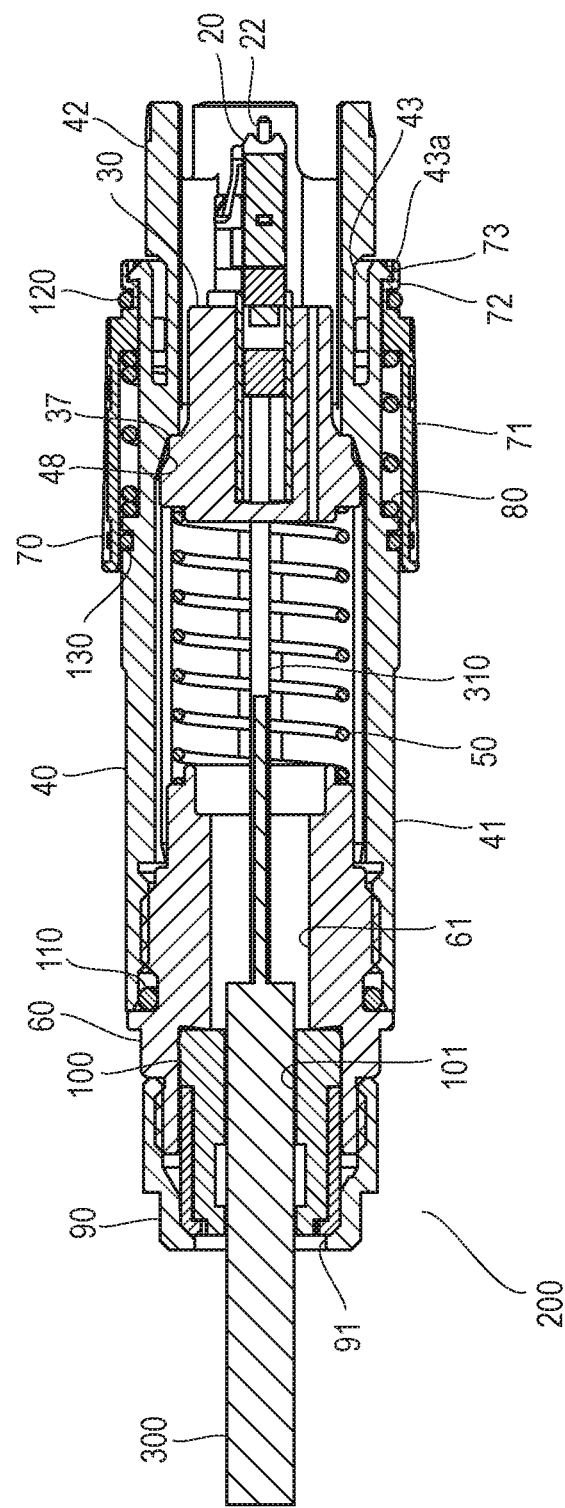
FIG. 3 is an enlarged sectional view taken along line 3-3 of FIG. 2A.
Figure 4B:
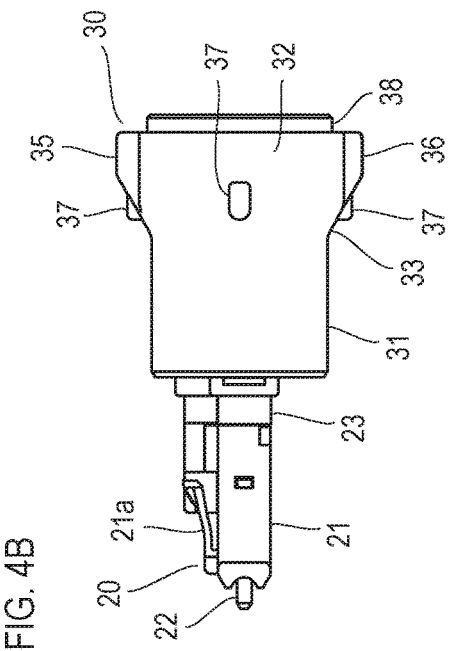
FIG. 4B is a side view of the inner housing shown in FIG. 4A.
Figure 4D:
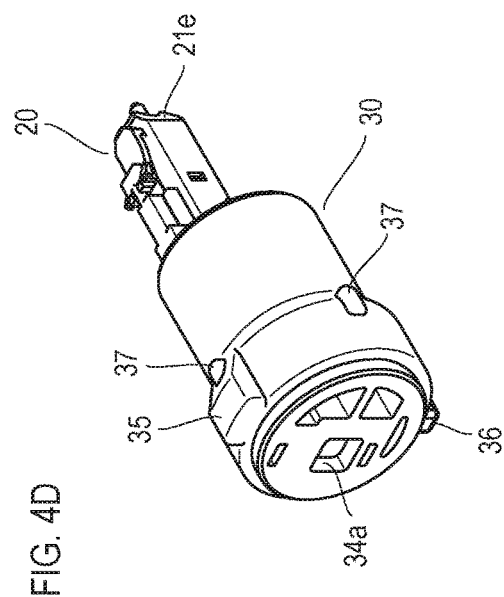
FIG. 4D is a perspective view of the inner housing shown in FIG. 4A.
Figure 4A:
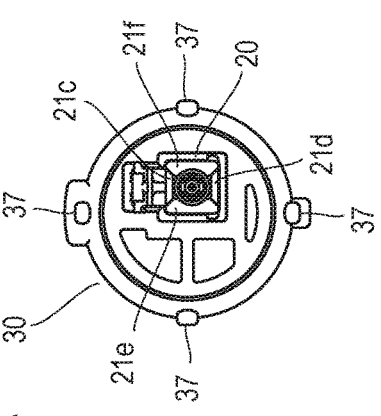
FIG. 4A is a front view of an inner housing in FIG. 3.
Figure 4C:
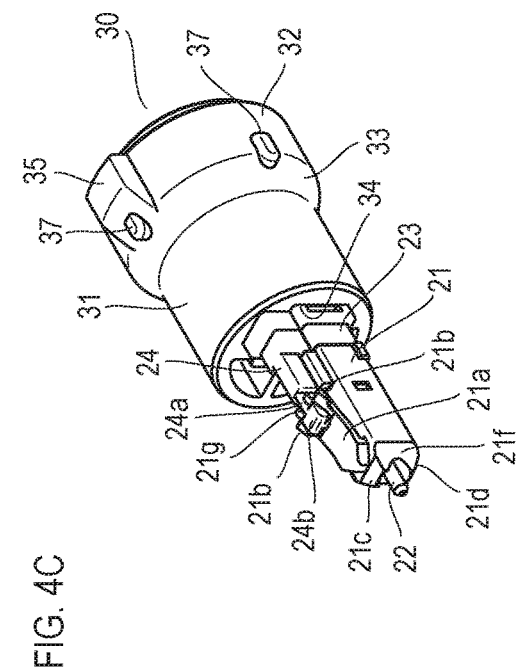
FIG. 4C is a perspective view of the inner housing shown in FIG. 4A.
Figure 6A:
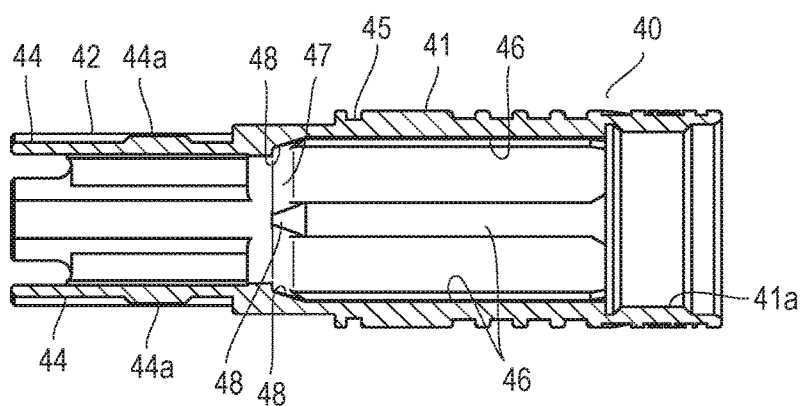
FIG. 6A is an enlarged sectional view taken along line 6A-6A of FIG. 5B.
Figure 6B:
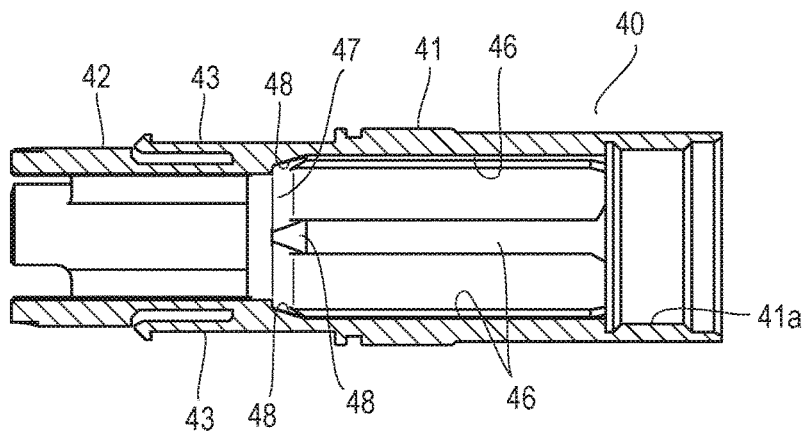
FIG. 6B is an enlarged sectional view taken along line 6B-6B of FIG. 5A.

FIGS. 2A to 2C show the outer appearance of an embodiment of a connector-equipped plug according to the present invention, and FIG. 3 shows the sectional structure of the connector-equipped plug. In the example, a connector-equipped plug 200 is composed of an optical connector 20, an inner housing 30, an outer shell member 40, a coil spring 50, a stopper 60, a coupling 70, a coil spring 80, a grand nut 90, a bushing 100, and O-rings 110, 120, and 130. Note that reference numeral 300 in FIGS. 2B, 2C, and 3 denotes an optical cable and 310 denotes optical fiber extracted from the optical cable 300.

FIGS. 4A to 4D show the details of the inner housing 30 and the optical connector 20 held by the inner housing 30. The configuration of the optical connector 20 will be described first.

The optical connector 20 is an LC connector in the example and includes a sleeve 21 in the shape of a rectangular tube, a ferrule 22 which is attached to a terminal of the optical fiber 310 and is arranged inside the sleeve 21, a stopper 23 which is arranged behind the sleeve 21, and a slider 24. Although hidden in FIGS. 4A to 4D, the optical connector 20 includes a ferrule holder which holds a rear end side of the ferrule 22, a coil spring which pushes the ferrule holder in a direction in which the ferrule 22 projects from a distal end of the sleeve 21, and a coil spring which pushes the slider 24 forward (in a direction toward the sleeve 21).

A latch piece 21a is formed on an upper surface of the sleeve 21 in the shape of a rectangular tube. In the latch piece 21a, a portion located on a distal end side of the sleeve 21 is a fixed end while a portion located on a rear end side is a free end. Protrusions 21b are formed at the free end so as to project on two sides in a width direction. The distal end of the sleeve 21 is chamfered, and four upper, lower, left, and right sloped surfaces 21c to 21f are formed by the chamfering. With the sloped surfaces 21c to 21f, the distal end of the sleeve 21 has a tapered shape.

The slider 24 is located so as to surround the stopper 23 and is capable of being displaced in a front-back direction with respect to the stopper 23. A coupling portion 24a which projects forward is formed on the slider 24, and a pressing protruding portion 24b is formed ahead of the coupling portion 24a. The coupling portion 24a is passed through a notch 21g which is formed on a free end side of the latch piece 21a, and the pressing protruding portion 24b is located on the latch piece 21a on the free end side of the latch piece 21a.

When the optical connector 20 with the above-described configuration is inserted into a mating adaptor, the protrusions 21b formed on the latch piece 21a catch on the adaptor, and the optical connector 20 is stopped from coming off and is connected to the adaptor. Rearward displacement of the slider 24 displaces the pressing protruding portion 24b, and the displacement of the pressing protruding portion 24b pushes the free end side of the latch piece 21a downward. This releases the protrusions 21b caught on the adaptor and allows the optical connector 20 to be detached from the adaptor.

The inner housing 30 has the shape of a circular cylinder on the whole and is larger in diameter on a rear end side than on a distal end side, and a sloped portion 33 is provided between a small-diameter portion 31 on the distal end side and a large-diameter portion 32 on the rear end side. The optical connector 20 is held by the inner housing 30 through storage of the slider 24 in a storage hole 34 which is open in a distal end face of the small-diameter portion 31.

Projecting portions 35 and 36 are formed to project at positions 180° apart from each other of an outer peripheral surface of the large-diameter portion 32, and the projecting portion 35 is set to be larger in circumferential width than the projecting portion 36. Note that front surfaces of the projecting portions 35 and 36 are shaped so as to be continuous with a sloped surface formed by the sloped portion 33.

Protrusions 37 are further formed to project on the outer peripheral surface of the large-diameter portion 32. In the example, four protrusions 37 are formed at intervals of 90°, and two of the four coincide with angular positions where the projecting portions 35 and 36 are formed. The protrusions 37 are formed to extend from the large-diameter portion 32 and lie slightly on the sloped portion 33. The protrusions 37 formed to coincide with the angular positions of the projecting portions 35 and 36 are formed to project on sloped surfaces formed by the sloped portion 33 and the projecting portions 35 and 36. The protrusions 37 have approximately oval shapes long in a front-back direction of the inner housing 30. Note that a protuberance 38 slightly smaller in diameter than the large-diameter portion 32 is formed to project at a rear end of the large-diameter portion 32.

The inner housing 30 that is located on a rear end side in an insertion direction of the optical connector 20 and holds the optical connector 20 is stored in the outer shell member 40. FIGS. 5A to 5D and 6A and 6B show the details of the outer shell member 40.

The outer shell member 40 has a tubular shape on the whole and has a base 41 and an insertion portion 42 which is formed to project forward from the base 41. The insertion portion 42 is a portion to be inserted into a mating receptacle and includes one pair of connection pieces 43. The one pair of connection pieces 43 is provided to be located at upper and lower portions of the insertion portion 42, and hooks 43a are formed to project outward at distal ends. Respective grooves 44 which extend in a projection direction of the insertion portion 42 are formed in left and right outer side surfaces of the insertion portion 42. Elevated portions 44a which are obtained by raising bottom surfaces of the grooves 44 are formed closer to the base 41 than a midpoint in extension directions of the grooves 44. A groove 45 is formed in an annular shape in a portion closer to the insertion portion 42 of an outer peripheral surface of the base 41.

A thread 41a is formed in an inner peripheral surface on a rear end side of the base 41 in the shape of a circular tube, and grooves 46 are formed in an inner peripheral surface on a side beyond the thread 41a of the base 41 so as to extend parallel to a central axis of the circular tube. In the example, four grooves 46 are formed at intervals of 90°, the groove 46 located at an upper portion of the four grooves 46 is set to be wider than the three other grooves 46.

An inner diameter of a distal end side of the base 41, from which the insertion portion 42 is formed to project, is made smaller than an inner diameter of a portion where the grooves 46 are formed of the base 41, with a sloped surface 47 between the distal end side and the portion. Four recesses 48 are formed in the sloped surface 47 to be located on extensions of the respective grooves 46. The recesses 48 decrease gradually in width toward the insertion portion 42, and bottom surfaces of the recesses 48 are formed so as to gradually approach a central axis of the base 41 toward the insertion portion 42. That is, the four recesses 48 are formed at intervals of 90° in the example and are formed such that the interval between bottom surfaces of the recesses 48 facing each other decreases gradually toward the insertion portion 42.

The inner housing 30 holding the optical connector 20 is inserted into the outer shell member 40 from a rear end of the outer shell member (from the base 41 side). At this time, the projecting portions 35 and 36 are inserted into the corresponding grooves 46 of the outer shell member 40, which controls rotation of the inner housing 30 and positions the inner housing 30 in a rotational direction. Note that the wide projecting portion of the inner housing 30 is inserted into the wide groove 46 of the outer shell member 40.

After the inner housing 30 holding the optical connector 20 is inserted, the coil spring 50 is inserted into the outer shell member 40. The stopper 60 is then screwed into and attached to the rear end of the outer shell member 40. At this time, the O-ring 110 is sandwiched between the stopper 60 and the outer shell member 40. The coil spring 50 is sandwiched between the inner housing 30 and the stopper 60 and enters a compressed state. The inner housing 30 is pushed forward (in the insertion direction of the optical connector 20 into an adaptor) by the coil spring 50. The four protrusions 37 are located at the respective recesses 48 of the outer shell member 40 and fit in distal end sides of the recesses 48. The protrusions 37 each enter a state butting against a distal end of the recess 48. With the fitting of the protrusions 37 in the distal end sides of the recesses 48, as described above, the inner housing 30 is positioned. This positions the optical connector 20 at an initial position inside the insertion portion 42 of the outer shell member 40.

In the example, the coupling 70 is formed into a tube having an octagonal outer shape, and a circular tubular portion 72 is provided at a distal end of an octagonal portion 71 to project slightly. An elevated portion 73 is formed on an inner peripheral surface of the circular tubular portion 72, and an inner diameter on a side closer to a distal end than the elevated portion 73 is set to be larger than an inner diameter on a rear end side in the circular tubular portion 72. The inner diameter of the octagonal portion 71 is set to be larger than that of the circular tubular portion 72 with the exception of a portion close to the circular tubular portion 72.

The coupling 70 is fit around the outer shell member 40 after the coil spring 80 is fit around the outer shell member 40 from a distal end of the outer shell member 40 (from the insertion portion 42 side). The coupling 70 is pushed further until the elevated portion 73 climbs over the hooks 43a of the one pair of connection pieces 43 of the outer shell member 40 and is located behind the hooks 43a. The coil spring 80 enters a compressed state, and the coupling 70 is pushed by the coil spring 80 and enters a state in which the elevated portion 73 butts against the hooks 43a.

The coupling 70 is stopped from coming off by the hooks 43a. Note that the O-ring 130 is sandwiched between a rear end side of the coupling 70 and the outer shell member 40 and that the O-ring 120 is attached to an outer peripheral surface of the circular tubular portion 72 of the coupling 70.

Meanwhile, after the bushing 100 is fit in a rear end side of the stopper 60, the grand nut 90 is screwed onto and attached to the stopper 60. The optical cable 300 extends through a hole 91 of the grand nut 90 and a hole 101 of the bushing 100 and is located inside a hole 61 of the stopper 60. The optical fiber 310 extends through the hole 61 of the stopper 60, an interior of the coil spring 50, and a hole 34a which communicates with the storage hole 34 of the inner housing 30 to the optical connector 20. The optical cable 300 is pinched and fixed by the bushing 100 compressed through the screwing of the grand nut 90.

FIGS. 7A to 7C show a receptacle 400 to which the connector-equipped plug 200 with the above-described configuration is to be connected. The receptacle 400 is attached to a housing 500 of, for example, a transmission apparatus with screws 410. An adaptor 421 which is formed at one end of an optical module 420 is inserted into and arranged inside the receptacle 400. In the example, the optical module 420 is a SFP (Small Form-factor Pluggable) module and is mounted on a board 600. The board 600 is fixed to a fixed member (not shown) different from the housing 500. As described above, the receptacle 400 and the optical module 420 are generally fixed to different members. Thus, the positional accuracy of the adaptor 421 inside the receptacle 400 cannot be said to be high, and misalignment is likely to occur.

FIGS. 8A to 8C, 9A to 9C, and 10A to 10C show, in order, processes of connection between the receptacle 400 storing the adaptor 421, which the optical connector 20 is to be inserted into and connected to, and the connector-equipped plug 200 in the context of a case where the positional accuracy of the adaptor 421 inside the receptacle 400 is low.

Figure 8A:
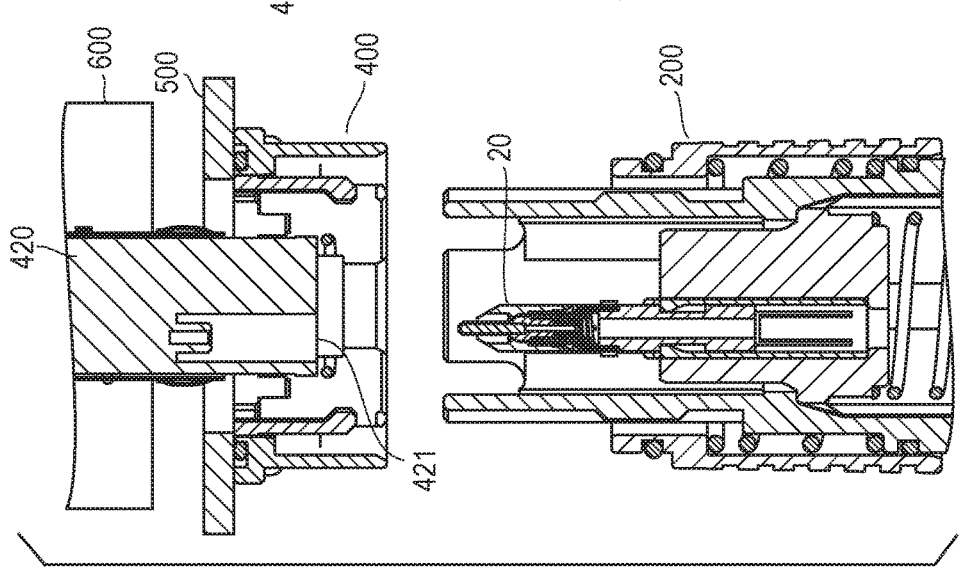
FIG. 8A is view showing a state before connection between the connector-equipped plug and the receptacle.

Processes (1) to (8) of connection will be described in order. Note that FIG. 8A shows a state before connection.

Figure 8B:
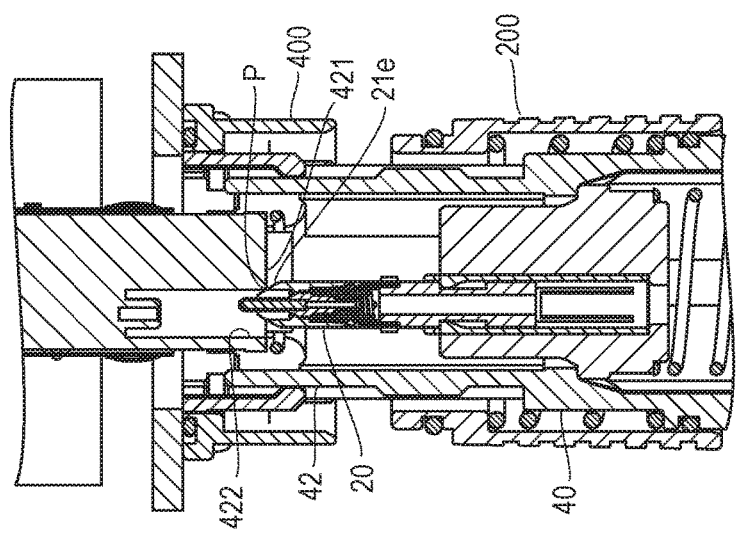
FIG. 8B is a view for explaining a process (1) of connection between the connector-equipped plug and the receptacle.

(1) The connector-equipped plug 200 is inserted into the receptacle 400. The insertion portion 42 of the outer shell member 40 is inserted into the receptacle 400, and the sloped surface 21e formed by chamfering the distal end of the optical connector 20 butts against an edge P of an opening 422, into which the optical connector 20 is to be inserted, of the adaptor 421 (FIG. 8B).

Figure 8C:
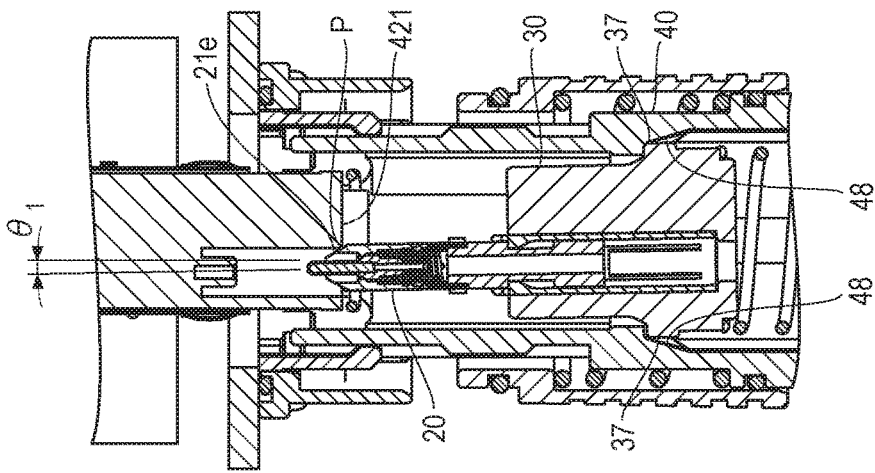
FIG. 8C is a view for explaining a process (2) of the connection between the connector-equipped plug and the receptacle.

(2) As described earlier, the inner housing 30 holding the optical connector 20 is incorporated in a state where the four protrusions 37 simply fit in the recesses 48 of the outer shell member 40, that is, only the four protrusions 37 are in contact with the outer shell member 40. When a force in a direction crossing a central axis of the inner housing 30 is applied to the inner housing 30, the inner housing 30 is tiltable easily. Thus, when the sloped surface 21e of the optical connector 20 held by the inner housing 30 butts against and is pushed against the edge P of the adaptor 421, since a force in such a direction crossing the central axis is applied to the inner housing 30, the inner housing 30 tilts abruptly, that is, the optical connector 20 tilts abruptly. $\theta_1$ denotes an angle of inclination of the optical connector 20 (FIG. 8C).

(3) The optical connector 20 is inserted into the opening 422 of the adaptor 421 while the inclination of the optical connector 20 increases. The angle of inclination of the optical connector 20 is $\theta_2$ ($\theta_2 > \theta_1$). Since the inner housing 30 is tiltable, as described above, and gaps are formed between the protrusions 37 and the outer shell member 40, the inner housing 30 has a floating structure which allows movement in a direction orthogonal to the central axis. The inner housing 30 moves backward while tilting together with the optical connector 20 (FIG. 9A).

(4) When the connector-equipped plug 200 is further inserted, the inclination of the optical connector 20 is corrected by the adaptor 421 while the optical connector 20 is inserted, and an angle $\theta_3$ of inclination is smaller than $\theta_2$. One pair of locking pieces 430 which are provided at the receptacle 400 climbs on the elevated portion 44a formed at the outer shell member 40 (FIG. 9B).

(5) A distal end face of the ferrule 22 of the optical connector 20 butts against a distal end face of a ferrule (not shown) inside the adaptor 421. Although not shown in FIG. 9C, the protrusions 21b of the latch piece 21a of the optical connector 20 are caught on the adaptor 421. Connection of the optical connector 20 to the adaptor 421 is completed (FIG. 9C).

(6) The connector-equipped plug 200 is further inserted. The coupling 70 is in a state where the coupling 70 butts against the locking pieces 430 of the receptacle 400 (FIG. 10A).

(7) A distal end of each locking piece 430 on the elevated portion 44a of the outer shell member 40 falls into the groove 44 beyond the elevated portion 44a (FIG. 10B).

(8) The coupling 70 enters into the receptacle 400. With the above-described processes, connection between the connector-equipped plug 200 and the receptacle 400 is completed (FIG. 10C).

As has been described above, in the connector-equipped plug 200 according to the present invention, the inner housing 30 holding the optical connector 20 is tiltable easily. With this configuration, when the sloped surface 21e (or 21c, 21d, or 21f) constituting the tapered shape of the distal end of the optical connector 20 butts against the edge of the opening 422 of the mating adaptor 421, the optical connector 20 tilts promptly and is guided into the opening 422. Thus, the optical connector 20 can be successfully connected even if the positional accuracy of the adaptor 421 inside the receptacle 400 is low. That is, the connector-equipped plug 200 can be successfully connected to the receptacle 400. Additionally, since the optical connector 20 tilts promptly even when the optical connector 20 butts against the edge of the opening 422, as described above, a pushing force at the time of connection of the connector-equipped plug 200 does not break the optical connector 20.

Note that the inner housing 30 has a floating structure in which the inner housing 30 can move in a direction orthogonal to a central axis of the outer shell member 40 with respect to the outer shell member 40 at the time of pushing (backward movement). Even if the optical connector 20 and the mating adaptor 421 are misaligned, the optical connector 20 can be successfully connected, as described above.

In a state where the connector-equipped plug 200 is connected to the receptacle 400, the inner housing 30 is back, as shown in FIG. 10C, that is, the protrusions 37 are off the recesses 48 of the outer shell member 40. At the time of detachment of the connector-equipped plug 200 from the receptacle 400, the inner housing 30 is pushed back by the coil spring 50. Accordingly, the protrusions 37 fit in the recesses 48 and return inevitably to initial positions where the protrusions 37 butt against the distal ends of the recesses 48. In a state where the protrusions 37 are at the initial positions again, the inner housing 30 is not floating and is positioned at a predetermined position.

FIG. 11A shows a state where the protrusions 37 fit in the distal end sides of the recesses 48 and the inner housing 30 is positioned with respect to the outer shell member 40. FIG. 11B shows a state where the inner housing 30 is pushed back and returns to an initial position at the time of detachment of the connector-equipped plug 200. Note that FIGS. 11A and 11B are shown as transparent views and that the protrusions 37 are hatched.

In the above-described connector-equipped plug 200, the protrusions 37 are formed on an outer peripheral surface of the inner housing 30, and the recesses 48, in which the protrusions 37 are to fit, are formed in an inner peripheral surface of the outer shell member 40. The protrusions 37 and the recesses 48 may be formed the other way around, that is, a configuration may be adopted in which protrusions are formed on an outer shell member and recesses are formed in an inner housing. FIGS. 12A to 12D and 13A to 13E show an inner housing 30' and an outer shell member 40' with the above-described configurations, respectively. FIGS. 12A to 12D show the inner housing 30' in a state holding an optical connector 20. Note that portions corresponding to the inner housing 30 shown in FIGS. 4A to 4D and portions corresponding to the outer shell member 40 shown in FIGS. 5A to 5D and 6A and 6B are denoted by same reference characters.

As shown in FIGS. 12A to 12D, in the inner housing 30', recesses 39 are formed to extend from an outer peripheral surface of a large-diameter portion 32 to a sloped portion 33. Four recesses 39 are formed at intervals of 90°, and two of the four coincide with angular positions where projecting portions 35 and 36 are formed. The recesses 39 decrease gradually in width and depth in a direction opposite to an insertion direction of the optical connector 20 into an adaptor 421.

As shown in FIGS. 13A to 13E, in the outer shell member 40', respective protrusions 49 are formed on extensions of four grooves 46 which are formed at intervals of 90° in an inner peripheral surface of a base 41.

In a connector-equipped plug having the inner housing 30' and the outer shell member 40', the inner housing 30' is positioned at an initial position when the inner housing 30' is pushed by a coil spring 50, and the protrusions 49 of the outer shell member 40' fit in rear end sides of the recesses 39. The inner housing 30' is tiltable while the protrusions 49 fit in the recesses 39, like the inner housing 30.

In the above-described embodiments, the numbers of protrusions 37 and protrusions 49 are both set to 4, and a configuration is adopted in which four protrusions fit in respective recesses having sloped bottom surfaces. At least two protrusions will suffice to position an inner housing at an initial position. In the case of two protrusions, the protrusions are preferably formed at positions 180° apart from each other on a circumference. Alternatively, the number of protrusions may be set to 3.

In this case, protrusions are preferably formed at, for example, equal angular intervals (intervals of 120°) on a circumference. Note that since a pushing force of the coil spring 50 is applied to protrusions, if the number of protrusions is larger, a spring force can be more widely dispersed. A larger number of protrusions are more favorable to avoidance of breakage of a protrusion due to a spring force.

Note that the distal end side of the sleeve 21 of the optical connector 20 is formed by chamfering to have a tapered shape like the shape of a frustum of a quadrangular pyramid. The distal end side, however, is not limited to this and may have a tapered shape like the shape of a frustum of a cone.

The inner housing 30 or 30' holds one optical connector 20 but may hold a plurality of optical connectors 20.

In the above-described examples, a connector-equipped plug has the built-in optical connector 20. A built-in connector may be, for example, an electric connector.

What is claimed is:

1. A connector-equipped plug which has a built-in connector to be inserted into and connected to an adaptor inside a receptacle and is to be connected to the receptacle, the connector-equipped plug comprising:
    an inner housing that is located on a rear end side in an insertion direction of the connector to hold the connector and has a plurality of protrusions formed on an outer peripheral surface;
    a spring that pushes the inner housing in the insertion direction; and
    a tubular outer shell member that has a plurality of recesses formed in an inner peripheral surface and is inserted into the receptacle; wherein
    the connector has a tapered shape on a distal end side in the insertion direction;
    the recesses are each formed such that the recess decreases gradually in width in the insertion direction and such that a bottom surface gradually approaches a central axis of the outer shell member in the insertion direction;
    the inner housing is positioned in a state where only the protrusions are in contact with the outer shell member by being pushed by the spring to fit the protrusions in distal end sides in the insertion direction of the respective recesses;
    the inner housing is tiltable when a force in a direction crossing a central axis of the inner housing is applied to the inner housing; and
    the inner housing is structured to float at the time of movement in a direction opposite to the insertion direction.

2. The connector-equipped plug according to claim 1, wherein
    the protrusions are formed at positions 180° apart from each other on a circumference.

3. The connector-equipped plug according to claim 2, wherein
    the protrusions comprise three protrusions formed at equal angular intervals on a circumference.

4. The connector-equipped plug according to claim 1, wherein
    the protrusions comprise four protrusions formed at equal angular intervals on a circumference.

5. The connector-equipped plug according to claim 1, wherein
    the tapered shape is formed by four upper, lower, left, and right sloped surfaces.

6. The connector-equipped plug according to claim 2, wherein
    the tapered shape is formed by four upper, lower, left, and right sloped surfaces.

7. The connector-equipped plug according to claim 3, wherein
    the tapered shape is formed by four upper, lower, left, and right sloped surfaces.

8. The connector-equipped plug according to claim 4, wherein
    the tapered shape is formed by four upper, lower, left, and right sloped surfaces.

9. The connector-equipped plug according to claim 1, wherein
    a plurality of the connectors are held by the inner housing.

10. The connector-equipped plug according to claim 1, wherein
    the connector is an optical connector.

11. A connector-equipped plug which has a built-in connector to be inserted into and connected to an adaptor inside a receptacle and is to be connected to the receptacle, the connector-equipped plug comprising:
    an inner housing that is located on a rear end side in an insertion direction of the connector to hold the connector and has a plurality of recesses formed in an outer peripheral surface;
    a spring that pushes the inner housing in the insertion direction; and
    a tubular outer shell member that has a plurality of protrusions formed on an inner peripheral surface and is inserted into the receptacle; wherein
    the connector has a tapered shape on a distal end side in the insertion direction;

the recesses are each formed such that the recess decreases gradually in width and depth in a direction opposite to the insertion direction;

the inner housing is positioned in a state where only the protrusions are in contact with the inner housing by being pushed by the spring to fit the protrusions in rear end sides in the insertion direction of the respective recesses;

the inner housing is tiltable when a force in a direction crossing a central axis of the inner housing is applied to the inner housing; and the inner housing is structured to float at the time of movement in a direction opposite to the insertion direction.

12. The connector-equipped plug according to claim 11, wherein
the protrusions are formed at positions 180° apart from each other on a circumference.

13. The connector-equipped plug according to claim 11, wherein
the protrusions comprise three protrusions formed at equal angular intervals on a circumference.

14. The connector-equipped plug according to claim 11, wherein
the protrusions comprise four protrusions formed at equal angular intervals on a circumference.

15. The connector-equipped plug according to claim 11, wherein
the tapered shape is formed by four upper, lower, left, and right sloped surfaces.

16. The connector-equipped plug according to claim 12, wherein
the tapered shape is formed by four upper, lower, left, and right sloped surfaces.

17. The connector-equipped plug according to claim 13, wherein
the tapered shape is formed by four upper, lower, left, and right sloped surfaces.

18. The connector-equipped plug according to claim 14 wherein
the tapered shape is formed by four upper, lower, left, and right sloped surfaces.

19. The connector-equipped plug according to claim 11, wherein
a plurality of the connectors are held by the inner housing.

20. The connector-equipped plug according to claim 11, wherein
the connector is an optical connector.

* * * * *

UNITED STATES PATENT AND TRADEMARK OFFICE
CERTIFICATE OF CORRECTION

PATENT NO. : 10,067,300 B2
APPLICATION NO. : 15/521417
DATED : September 4, 2018
INVENTOR(S) : Katagiyama et al.

It is certified that error appears in the above-identified patent and that said Letters Patent is hereby corrected as shown below:

Column 6, Line 3, "the outer shell member (from the base 41 side)" should read -- the outer shell member 40 (from the base 41 side) --.

Column 6, Line 8, "portion of the inner housing 30" should read -- portion 35 of the inner housing 30 --.

Column 10, Line 22 (Claim 3, Line 1), "The connector-equipped plug according to claim 2," should read -- The connector-equipped plug according to claim 1, --.

Column 12, Line 15 (Claim 18, Line 1), "according to claim 14" should read -- according to claim 14, --.

Signed and Sealed this
Eighteenth Day of June, 2019

Andrei Iancu
*Director of the United States Patent and Trademark Office*